US009635075B2

(12) United States Patent
Ma et al.

(10) Patent No.: US 9,635,075 B2
(45) Date of Patent: Apr. 25, 2017

(54) METHOD AND APPARATUS FOR ASSIGNING IDENTIFIERS TO MEDIA SERVICES

(75) Inventors: Xiao Jun Ma, Beijing (CN); Jun Li, Cranbury, NJ (US); Lin Du, Beijing (CN); Jian Ping Song, Beijing (CN)

(73) Assignee: Thomson Licensing DTV, Issy les Moulineaux (FR)

( * ) Notice: Subject to any disclaimer, the term of this patent is extended or adjusted under 35 U.S.C. 154(b) by 296 days.

(21) Appl. No.: 12/660,962

(22) Filed: Mar. 8, 2010

(65) Prior Publication Data

US 2010/0246597 A1   Sep. 30, 2010

(30) Foreign Application Priority Data

Mar. 30, 2009   (EP) ..................... 09290232

(51) Int. Cl.
*H04L 12/28* (2006.01)
*H04L 29/06* (2006.01)
*H04N 21/235* (2011.01)
*H04N 21/435* (2011.01)
*H04N 21/438* (2011.01)
*H04N 21/4782* (2011.01)
*H04N 21/482* (2011.01)
*H04N 21/858* (2011.01)

(52) U.S. Cl.
CPC ...... *H04L 65/4076* (2013.01); *H04L 65/4084* (2013.01); *H04N 21/235* (2013.01); *H04N 21/435* (2013.01); *H04N 21/4383* (2013.01); *H04N 21/4782* (2013.01); *H04N 21/482* (2013.01); *H04N 21/8586* (2013.01)

(58) Field of Classification Search
CPC ............................ H04H 20/55; H04L 1/0065
USPC ........ 370/431, 312; 348/732, 734; 725/151, 725/95; 709/227, 238
See application file for complete search history.

(56) References Cited

U.S. PATENT DOCUMENTS

| 5,819,284 A * | 10/1998 | Farber et al. ............... 709/203 |
| 2001/0039584 A1 * | 11/2001 | Nobakht et al. ............. 709/227 |
| 2002/0188952 A1 | 12/2002 | Istvan et al. |
| 2003/0037030 A1 * | 2/2003 | Dutta et al. ..................... 707/1 |
| 2003/0133050 A1 * | 7/2003 | Shintani et al. ............. 348/734 |
| 2005/0204379 A1 | 9/2005 | Yamamori |
| 2006/0020750 A1 * | 1/2006 | Senoo ......................... 711/112 |

(Continued)

FOREIGN PATENT DOCUMENTS

| JP | 200448794 | 2/2004 |
| JP | 2008148144 | 6/2008 |

(Continued)

OTHER PUBLICATIONS

Search Report Dated August 24, 2009.

*Primary Examiner* — Jamal Javaid
(74) *Attorney, Agent, or Firm* — Brian J. Dorini; Reitseng Lin (57) ABSTRACT

A user assigns a major and minor channel number combination to a media service which does not have such a pre-existing combination, where such a media service is accessed by using such a channel combination without having to resort to the typical means of accessing the media service, such as using a web site URL or radio frequency. Optionally, the invention will automatically update the minor numbers associated with a media service when older versions of the media service become unavailable.

9 Claims, 5 Drawing Sheets

(56) References Cited

U.S. PATENT DOCUMENTS

2008/0162437 A1* 7/2008 Choi .................. G06F 17/30265
2009/0282013 A1* 11/2009 Joshi et al. ....................... 707/5

FOREIGN PATENT DOCUMENTS

| KR | 20010018978 | 3/2001 |
| KR | 20060044309 | 5/2005 |
| KR | 20070087415 | 8/2007 |
| KR | 2010036512 | 4/2010 |
| WO | WO 02/082766 | 10/2002 |
| WO | WO 2004/061637 | 7/2004 |

* cited by examiner

| 402 MAJOR # | 404 MINOR # | 406 MEDIA SERVICE |
|---|---|---|
| 2 | 1 | WBBM-TV CHICAGO NEWS CHANNEL ～410 |
| 2 | 3 | PRICE IS RIGHT - WBBM TV CHICAGO ～420 |
| 102 | 0 | HTTP://WWW.YAHOO.COM ～430 |
| 205 | 0 | WBBM-AM RADIO CHICAGO 780 AM ～440 |
| 305 | 1 | EXTENSION 720 POD CAST ～450<br>"LEECHES, FRIEND OR FOE"<br>MILT ROSENBERG - DECEMBER 10, 2008 |
| 305 | 2 | EXTENSION 720 POD CAST ～460<br>"FROST/NIXON MOVIE"<br>MILT ROSENBERG - DECEMBER 17, 2008 |
| 310 | 0 | KROCK - "OPIE AND ANTHONY" ～470<br>92.3 MHZ - NEW YORK<br>LIVE STREAM |

METHOD AND APPARATUS FOR ASSIGNING IDENTIFIERS TO MEDIA SERVICES

This application claims the benefit, under 35 U.S.C. §119 of European Patent Application 09290232.9, filed Mar. 30, 2009.

FIELD OF THE INVENTION

The invention is related to the playback of media services, specifically the development of alternative means for accessing such media services.

BACKGROUND OF THE INVENTION

For a media device, such as a television set or a set top box, a user receives video programming that can be broadcasted through various means such as terrestrial, satellite, or cable. For example, in the United States, video programming is transmitted terrestrially via the use of radio frequency waves. The video programming is then accessed by a user via a television set or a set top box that demodulates, demultiplexes, and decodes a MPEG-2 transport stream that is transmitted on a specific frequency. Such a frequency is associated with a channel number called a physical channel. Hence, when a tuner tunes to a specified radio frequency, the tuner can use the mapping between a channel number for physical channel and the radio frequency that corresponds to such a physical channel. The relationships between physical channels and radio frequencies used for television broadcasts can be defined from a governmental agency such as the Federal Communication Commission (FCC) which is in charge of regulating the airwaves in the United States.

When an MPEG-2 stream is demultiplexed, a packet identifier table can be used to reconstitute various audio, video, and auxiliary data into video programming, where such programming is accessed by using channel numbers. In this setting, the channel information in a stream is called a virtual channel, where the channel number for the programming in an MPEG-2 stream does not have to be the same channel number associated with the radio frequency (physical channel number) used to transmit such programming. Additionally, video programming in an MPEG-2 stream can be accessed by using major and minor channels, where the major channel can be associated with a broadcaster, while a minor channel number can be associated with a sub-channel available from the broadcaster.

For example, the CBS station in Chicago is associated with channel 2, as a major channel, while the NBC station is associated with channel 5, as a different major channel. The programming from CBS can be further subdivided using minor channel numbers such that channel 2-1 is associated with a news broadcast, channel 2-2 is associated with weather information, and channel 2-3 is associated with the broadcast of game shows. These designations of virtual channel 2-1 and 2-2 do not have to correspond to the radio frequency for channel 2, but rather the real radio frequency used to broadcast the programming for "channel 2" can be on a different physical channel such as channel 10 or 12.

Regardless of whether the physical channel and the virtual channels are the same, the designations of major and minor channels (as virtual channels) are transmitted as part of the MPEG-2 information which is known as Program System Protocol Information (PSIP) as defined in accordance with Advanced Television System Committee N65 standard. Likewise, terrestrial virtual channel table information (TVCT) and cable virtual channel table information (CVCT) can also be transmitted as part of the PSIP information, where such tables define the relationship between virtual channels and the information transmitted as part of an MPEG-2 multiplex.

In contrast to the use of major and minor channels for television broadcast media services, the accessing of Internet based media services is not as easy as accessing television services. That is, with emergence of the Internet as a source of video and audio based media services, such Internet based media services are accessed using identifiers known as Uniform Resource Identifiers (URIs) or Internet Protocol (IP) addresses. Such identifiers however typically exist in the form of a large number of characters which are difficult to remember. Other forms of media services such as satellite radio, AM/FM radio, video on demand from service providers, Internet Protocol based television (IPTV) and the like, typically have their own unique identifiers, which do not use the major/minor channel combinations as used for satellite, terrestrial, or cable television.

SUMMARY OF THE INVENTION

A method is disclosed where media services from different sources are assigned a common numerical structure, where such a structure acts as a replacement for the typical ways for accessing such media services.

DETAILED DESCRIPTION OF THE INVENTION

For purposes of this application, the term media service can be audio services (e.g., music, radio based talk show, streaming audio) and/or video services (e.g., television shows, movies, computer/video games). Such media services can be received via a remote source (e.g., satellite, Internet, cable, broadcast antenna, public switched telephone network (PSTN), cellular network, infrared transmitter). A service provider is known as an entity that can send media services to multimedia devices including, for example, digital satellite systems, modems, and antennas. These types of devices process the media services signals and can distribute such services to other devices or a device that such components are connected to. Multimedia devices such as digital satellite systems and modems can be bi-directional; so as to communicate with remote sources for requesting media services (for example, a video on demand programming from a cable service, an Internet source such as NETFLIX™ and the like, and a bi-directional multimedia service operator who delivers via a connection audio and video services), electronic program guide information, upgrading software drivers and codecs, and the like.

Examples of the content of media service files includes songs, political speeches, news broadcasts, movie trailers, movies, television shows, live broadcasts, radio broadcasts, financial conference calls, live concerts, web-cam footage, and other special events; although this list is not exhaustive.

This application also makes use of the term "media service device" which is a device that is capable of rendering a media service. Examples of media service devices include televisions, radios, set top boxes, computers, desktop computers, laptop computers, video game systems, telephones, portable media device, MP3 players, portable audio devices, portable video devices, and combination thereof, and the like, where such a definition is not limited to future or currently known devices.

Figure 1:
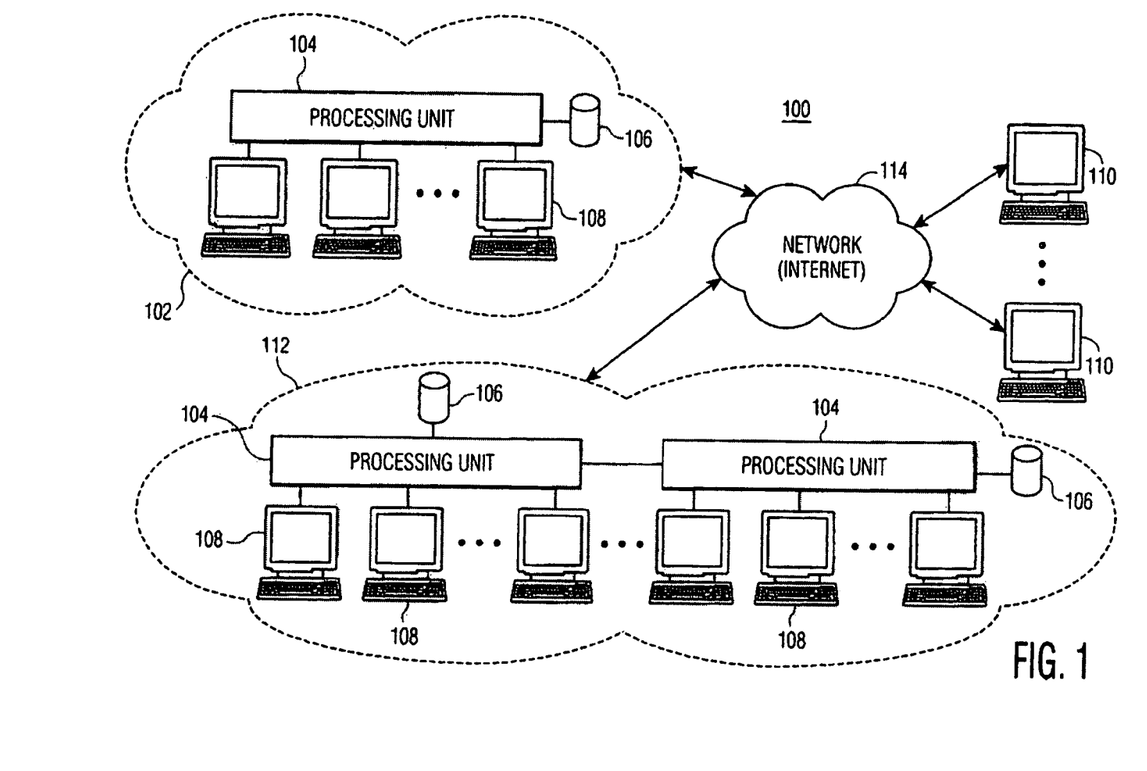
FIG. 1 is an exemplary embodiment of a system of computer devices, operating as media devices, in accordance with the principles of the present invention.

FIG. 1 shows an overview of a system 100 that has media services available through a communications network. Each computer system network 102 and 112 contains at least one corresponding local computer processor unit 104 (e.g., server), which is coupled to at least one corresponding local data storage unit 106 (e.g., database), and local network users 108. A computer system network can be a local area network (LAN) 102 or a wide area network (WAN) 112, for example. The local computer processor units 104 are selectively coupled to media centers 110 through the network (e.g., Internet) 114. Each of the plurality of local computer processors 104, the network user processors 108, and/or the media centers 110 can have various devices connected to system, for example a computer system, television set, video tape recorder, personal video recorder, digital video disc (DVD), and the like. A local computer processor 104, network user processor 108, and/or media center 110 are programmed with a media browser for locating and selecting (e.g., by clicking with a mouse) a media service that is located in the local data storage unit 106 of a computer system network 102, 112. The media services can contain links to other computer systems, Web pages, and other media content.

Local computer processor 104 and network user processor 108 can, for example, be a computer terminal, a pager which can communicate through the Internet using an Internet Protocol (IP) based communication, a Kiosk with Internet access, a connected electronic organizer/communication device (e.g., a BLACKBERRY™ device manufactured by Blackberry, Inc.) or other device capable of interactive communication through a network, such as an electronic personal planner. The local computer processor 104, the network user processor 108, and/or the media center 110 can also be a wireless device, such as a hand held unit (e.g., cellular telephone such as the IPHONE™ sold by Apple Computer), that connects to and communicates through the Internet using a wireless based EDGE or 3G network). Networks 102 and 112 can be connected, for example, to the network 114 by a modem connection, a Local Area Network (LAN), cable modem, digital subscriber line (DSL), twisted pair, wireless based interface (cellular, infrared, radio waves), or equivalent connection utilizing data signals. Databases 106 can be connected to the local computer processor units 104 by any means known in the art. Databases 106 can take the form of any appropriate type of memory (e.g., magnetic, optical, etc.). Databases 106 can be external memory or located within the local computer processor 104, the network user processor 108, and/or the media center 110. Database 106 can have media services and related metadata that can be retrieved by media center 110.

In an exemplary embodiment of the invention, network processors 108 and/or media center 110 include one or more program modules that allow user processors 108 and/or media center 110 to communicate with local processor 104, and each other, over network 114. The program module(s) include program code, for example, written in PERL, Extensible Markup Language (XML), JAVA, Hypertext Mark-up Language (HTML), any other equivalent language that allows network user processors 108 to access the program module(s) of the local processors 104 through browser programs stored on network user processors 108, or any combination thereof.

Web sites, web pages, and data stores (FTP, servers, etc.) are locations available through a network, such as the Internet, where media services reside. A web site, and/or data store can comprise a single or several web pages, media services, media content, media files, and the like. A web page is identified by a Uniform Resource Locator (URL), as an example of a uniform resource identifier, comprising the location (address) of the web page on the network. Web sites, web pages, and data stores can be located on local area network 102, wide area network 112, network 114, processing units (e.g., servers) 104, and user processors 108. Media services and related metadata can be stored in any storage device, such as a hard drive, compact disc, and mainframe device, for example. Content can be stored in various formats, which can differ, from web site to web site, from data store to data store, and even within a web page.

Figure 2:
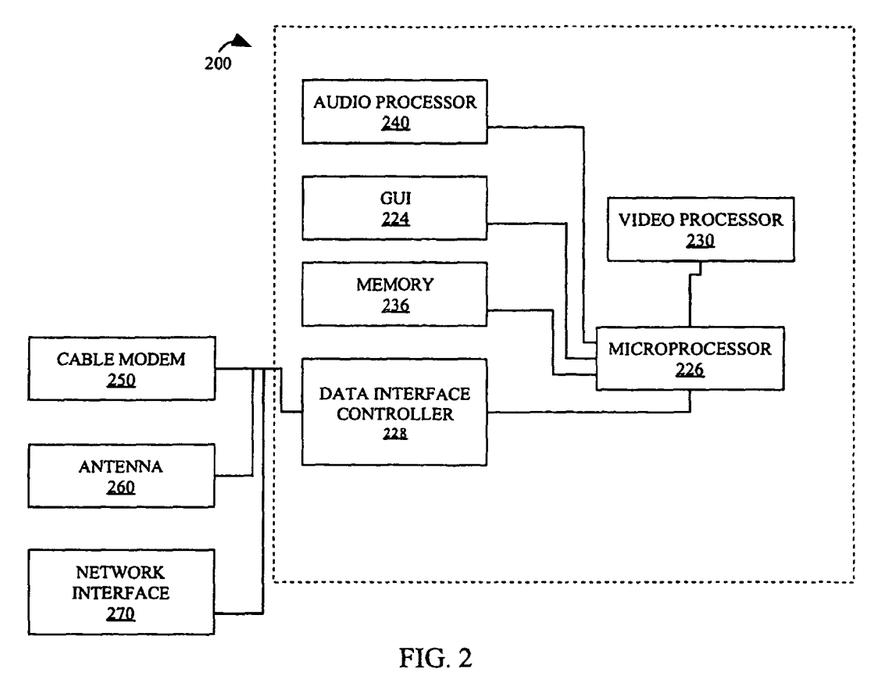
FIG. 2 is an exemplary embodiment of a sample media device, in accordance with the principles of the present invention.

FIG. 2 shows an exemplary embodiment of a set top box 200, as an example of a device capable of receiving, transmitting, and for submitting queries about audio/video media services. Video processor 230 and audio processor 240 are used by set top box 200 for rendering a media service. Video processor 230 also displays characters of selections made via a user control device, as a remote control, via an on screen display (OSD) function. Guided User Interface 224 (GUI) is a control system that allows the functions of set top box 200 (related to rendering a media service, sound/graphic options, and the like) to be controlled graphically, as through the use of a user operated indicator (as an arrow, cursor, or the like). Memory 236 stores programming modules, maintenance routines, extracted metadata from media services, search results, and other data necessary to operate set top box 200. Microprocessor 226 controls the operation of set top box 200, where microprocessor 226 is coupled to GUI 224, video processor 230, memory 236, and audio processor 240. Data interface/controller 228 couples microprocessor 226 to a communication interfaces as cable modem 250 (for receiving broadband media services), antenna 260 (for receiving broadcasted programming via terrestrial/satellite sources), or network interface 270 (such as an Ethernet card which is used receiving broadband media services through a communications network, for example, the Internet). Other components or modules can be used with set top box (STB) 200, in accordance with the principles of the invention.

The operation of set top box 200 allows a user to assign different identifiers to the media services, for which the set top box receives and/or processes. In an exemplary embodiment of the invention, the identifiers used will be numerical identifiers which typically are used for television channels. The invention however takes the approach for such channel numbers as provides such identifiers for media services which typically do not have such an associations. For example, an exemplary embodiment of the invention allows a user to assign major and minor channel numbers to different web pages, which are obtained through a communication network such as the Internet. In this example, broadcast television channels would retain their typical designators (assume channels 1-100) while web sites can be assigned identifiers in a second range (101-200).

Hence, a user can assign different channel identifiers to various web sites, for example, a first web site (such as "THOMSON.NET") can be assigned channel identifier 101, a second web site (such as "YAHOO.COM") can be assigned to channel identifier 102, and a third web site (such as "GAMEFAQS.COM") can be assigned to a third channel identifier 103. That is, if the user switches between channels by using an input device, for example, a remote control, channels 1-100 would provide media services associated with broadcasted television channels, while channel 102 brings up a representation of the content on the homepage of YAHOO.com. Presumably, the user can use the remote control to operate the YAHOO.com web page in a manner consistent with a web browser. The remote would allow a user to manipulate the web page via buttons, a track ball, mouse, and/or other type of input means.

Figure 3:
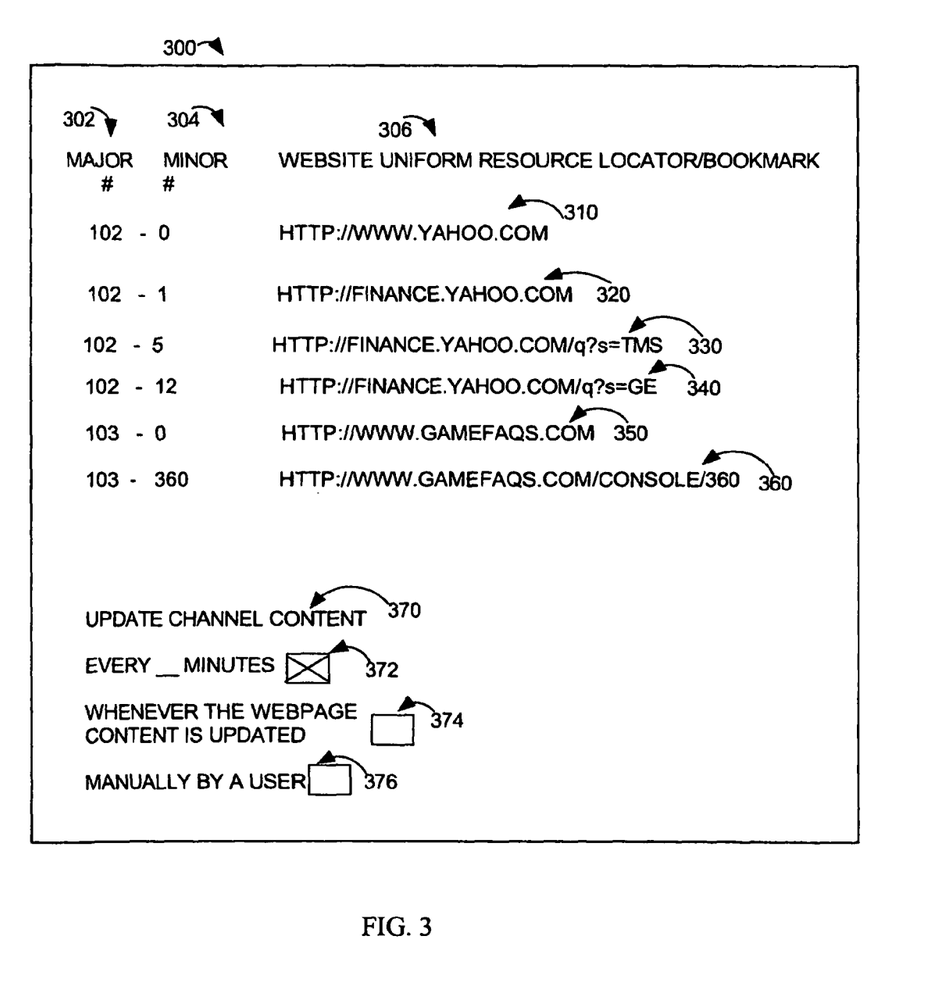
FIG. 3 is an exemplary embodiment of a user interface for assigning major and minor channel combinations to web based media services.

FIG. 3 shows an exemplary embodiment of the principles of the present invention where a user assigns both major and minor channels to the structure of a web site. As stated before, the principles of the present invention allow for a user to assign channel identifiers to web site. That is, a user assigns a major channel number to a web site. Further web pages on a web site can then be assigned minor channel numbers, so that the combination of a major and minor channel number would denote a specific location of a web site.

User interface 300 displays various options that a user can employ to assign both major and minor numbers to various parts of a website. Specifically, the interface allows a user to assign such numbers to the Uniform Resource Locators (URLs) or bookmarks which are typically associated with web sites, where such URLs are not needed for a user to access a web site, in the future, if the proper major/minor channel combination corresponding to the website was used. As shown, major number 302 is a major number that a user can assign to a web site. In the present example, the major number can have a range from 1-9999, although other ranges can be used or other identifiers such as combinations of alphanumeric characters can be used to assign identifiers, as well. Similarly, minor number 304 can have a numeric value from 0-9999 or be a combination of alphanumeric characters. It is to be understood that such assignments can be performed by a user via use of a remote control or other type of input device.

If a user assigns a major and minor number to a first media service, where such a combination of major and minors numbers already exists, the apparatus will notify the user that such a combination exists and indicate the second media service to which the combination is already assigned. The user will then have the option of overwriting the pre-existing combination, or providing an alternative major and minor number combination for the first media service.

The various Uniform Resource Locators (URLs) and bookmarks, which correspond to respective websites, are assigned in the list 306. The URLs in 306 are the web addresses that are used by a web browser to obtain the programming code from various servers accessed via the web site address, that are typical rendered in the form of a web page. Web sites can also be accessed by using the Internet Protocol Address that corresponds to a web site, as well. An optional embodiment of the invention provides the user the ability to cut and paste a web site address, from a browser window or a hyperlink, to the interface shown in FIG. 3, by using a remote control or other type of input device.

Web addresses 310, 320, 330, 340, 350, and 360 correspond to the respective web sites that can be found at such addresses. For example, 310 corresponds to the home page found at YAHOO.COM, while 320 corresponds to the sub-web page from the YAHOO.COM website that corresponds to YAHOO's Finance information. Additionally, the website addresses 330 and 340 correspond to the respective stock quotes of Thomson (TMS) and General Electric (GE), respectively. That is, if a user wants to bring up the stock quote for Thomson from the Yahoo website, the user would type in the major number 102, and the minor number 5. Likewise, if the user wanted the stock quote for General Electric from the Yahoo website, the user would type in the major number 102, and the minor number 12.

The major/minor combination of 103-0 (for 350) corresponds to the website GAMEFAQS.COM, while the major/minor combination of 102-360 (for 360) corresponds to the content on the GAMEFAQS.COM website that corresponds to the XBOX 360 console. Other website addresses can be entered and identified using other combinations of major/minor number combinations, in accordance with the principles of the present invention.

Option 370 provides a user the ability to specify how often the website web page information is to be updated. Option 372 allows a user to specify that the website information is to be updated every X minutes, where X is a value specified by a user between the ranges of 1 to 1000. This type of option would have a program such as a browser running in the background for STB 200, where the browser requests the contents from a website every X minutes, as specified by a user. Option 374 operates where the content for a website would be downloaded every time the website itself is updated. This type of automatic process relies on the STB 200, for example, to use a background program which maintains a connection with the linked website, so that anytime a forwarding command or refresh command was issued by the website, the background process could process such a command to request and receive such website content. Additionally, this part of the invention can make use of the Real Simple Syndication (RSS) feeds, which indicate when the material on a website has been updated. RSS feeds typically indicate a web site's address and when such a website received its last update, in the form of Extensible Markup Language (XML) code. Lastly, an option 376 of a manual refresh by a user would cause the STB 200 not to update website content, unless a user issued a manual refresh command, as for example, performed when the user uses the "refresh" command for a web browser. Additionally, an optional embodiment of the invention provides that options associated with 370 to be performed individually for each website, where, for example, the update for the stock quotes corresponding to 330 and 340 are performed anytime such quotes change, while the content at GAMEFAQS.COM for 350 would be updated every 60 minutes. Other variations of options exist, as to be employed in accordance with the principles of the present invention.

The principles of the present invention are not limited to the assignment of channel numbers to web sites. Other media services can also be assigned channel identifiers, as well. For example, radio stations can be assigned channel numbers in a third range while on demand media services, which come from a secondary source such as NETFLIX™, BLOCKBUSTER VIDEO™, a pod cast, streaming audio/video, or other types of service providers, can be assigned channel numbers in a fourth range. Likewise, additional media services can have other numeric ranges of the channels assigned to them, as needed.

For media services which are delivered on demand, an optional embodiment of the present invention is provided if such where the new channel numbers correspond to different media services which have been pre-queued by a user. That is, some media service providers such as NETFLIX™ allow for a user to pre-select what movies, audio services, televisions shows, they want to see where such selections are placed in a queue, where the media service provider allows a user to receive only a limited amount of these services at a time (such as three movies at a time). Additionally, the pre-selection queue allows a user to select an order of titles to be presented, where the presentation of media services will follow one after another.

The present invention would allow the media service provider to deliver those preselected media services on unique channels defined by a user, so that a user can assign whatever channel identifiers the user wants for the preselected on demand media services. For example, if the media service provide provides three movies at a time (which have been pre-selected from a queue), the user can assign one channel identifier for the delivery of the first movie, a second channel identifier, for the second movie, and a third channel identifier, for the third movie. Other variations exist, as to be appreciated by those in the art. Optionally, the content of the on-demand media services are paused when a user would change channels, for example, the movie with the first channel identifier is paused while the movie being delivered on the second channel identifier is being accessed by a user.

Figure 4:
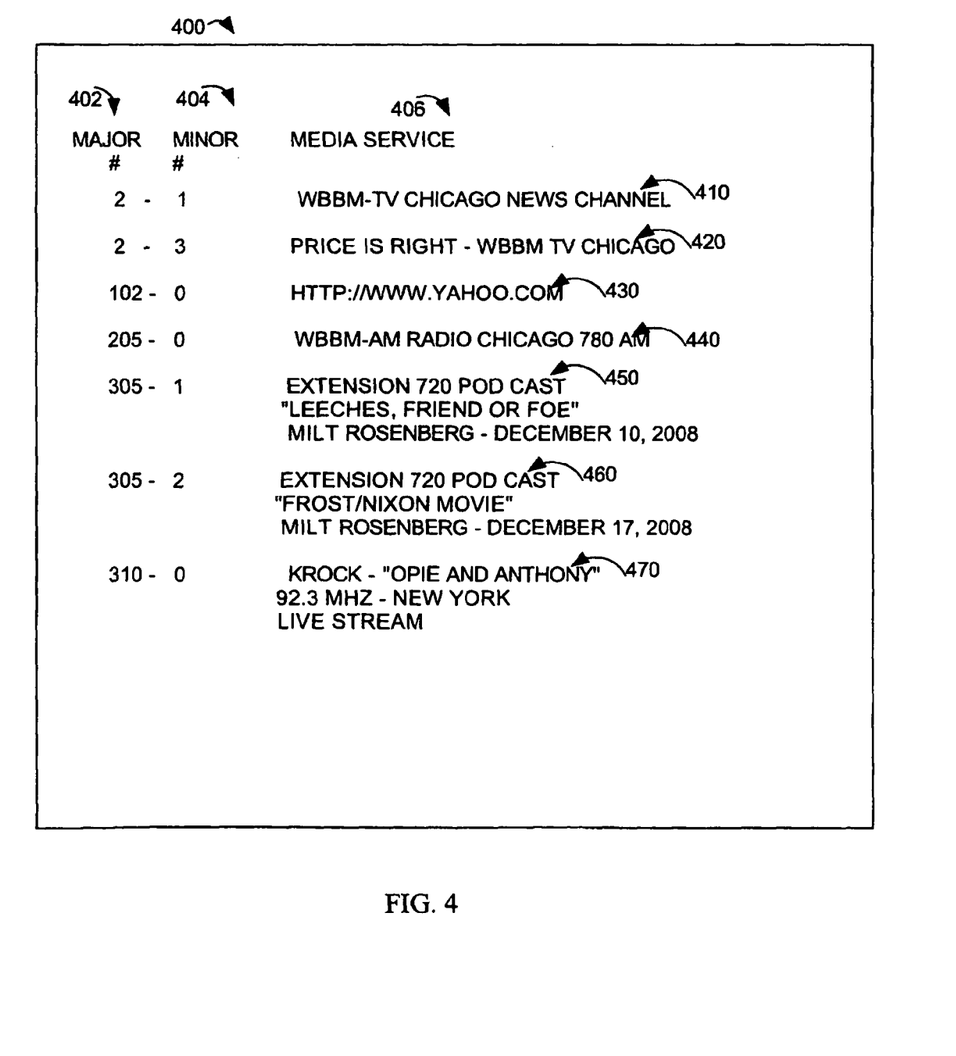
FIG. 4 is an exemplary embodiment of a user interface for assigning major and minor channel combinations for different media services.

FIG. 4 shows an exemplary embodiment of the principles of the present invention for a user interface 400 where different types of media services are assigned different combinations of major and minor numbers. Some of these media services have other designations, where the major and minor number combinations act as an alternative way of accessing such media services instead of using the typical means for accessing such media services. For example, the major-minor combination of 102-0 (430) is used to access the website at YAHOO.COM. Typically, a website is accessed using a web browser or other type of Internet based program where a URL address is typed in, but in the present invention, the YAHOO website can also be accessed by using the combination 102-0. Likewise, a radio station WBBM-AM is typically accessed by directing a radio tuner to tune to the frequency at 780 AM. In the present invention however, a user can access the radio programming from WBBM-AM by using the major/minor combination 205-0 (440), where the STB 220 will tune to that station using antenna 260. One could however introduce in a sub-channel for 205-1 (as an alternative or additional to the use of channel 2-1) to watch the television programming being broadcasted over WBBM-TV. In this way, one can associate a particular brand with a particular broadcaster, where multiple assets (audio and video) are associated with one major channel number: 205.

Specifically, user interface 400 is composed of a list of major channel numbers 402 and a list of minor channel numbers 404. Preferably, the range for major channel numbers 402 will be 1-9999, while the numerical range for minor channel numbers 404 will be 0-9999, although other numerical combinations or combinations of alphanumeric combinations can be used. Media service 406 indicates the association between the major/minor channel combination and the media service that such a combination is associated with. For example, the combination 2-1 is associated with the broadcast television channel WBBM-TV in Chicago, which is used for broadcasting a news program (410). This major/minor channel number corresponds to the actual broadcast channel used to broadcast programming for WBBM.

Likewise, entry 420 is for a game show that is transmitted as a sub-channel from WBBM-TV Chicago on sub-channel 2-3, which also corresponds to the channel use to transmit the game show "THE PRICE IS RIGHT". Entry 430 represents the homepage of the website YAHOO.COM, while entry 440 represents the live AM broadcast from WBBM-AM Radio in Chicago, Ill.

The major/minor combination of 305-1 corresponds to a podcast of the audio program Extension 720 (entry 450). The reception of the podcast is preferably done in accordance with a computer program that runs in the background of STB 200, in which the program allows a user to designate what type of podcasts the user wants to receive. The computer program will then subscribe to an RSS feed, where the computer program will download a new podcast from a server, via the Internet, each time the RSS feed indicates the presence of a new podcast. In the present example, the RSS feed includes information which identifies the content of various podcasts. That is, entry 450 corresponds to a podcast of the audio program Extension 720 which was produced on Dec. 10, 2008, while entry 460 corresponds to a podcast which was produced on Dec. 17, 2008. Such information in the podcast can include the title of the broadcast, "Extension 720", the subject of the podcast "FROST/NIXON", the date of the podcast, "Dec. 17, 2008", the host of the podcast, "Milt Rosenberg", and other types of information consistent with the principles of the present invention. The podcasts are then accessed by using the corresponding major/minor combinations associated with each podcast, "305-1" for entry 450 and "305-2" for entry 460.

In an optional embodiment of the present invention, the numbering of the minor channels for a respective podcast will change, as older podcasts are removed from a storage device, such as a local hard drive, server, and the like. In the present invention, for example, the entry for 460 could have its channel number change from "305-2" to "305-1" if the podcast for entry 450 were removed from the storage device it was on. Such a change in channel numbering can take place, when the STB 200 is configured to designated older podcasts (in time) with a lower minor number (approaching zero), than newer podcasts which would have a numbering that would have a higher minor number (moving away from zero).

A similar approach of numbering channel combinations can be implemented when a user requests that certain broadcasted programming be archived to a storage device, such as a personal video recorder, hard drive, digital versatile disc, BLU-RAY disc, solid state memory, and the like. That is, a user can designate that a certain media service be recorded anytime such a program is being broadcasted, for example, a user would associate the recording of the NBC Nightly News to a major channel number 315. Hence, each episode of the NBC Nightly News which is recorded will have the same major channel number 315, where each subsequently recorded show will have its minor channel number incremented positively.

The numbering of such programs has their minor channel numbers change where a program that is older in time, such as the news program from a Sunday (315-0), would have a lower minor channel which approaches zero, while the news program from Monday would have a high minor number (315-1) because such a program is later in time. The numbering of the recorded media services would change as the older programs are removed from the storage device as to become unavailable, which means the news program recorded on Monday would be identified with the channel combination 315-0, when the news program from Sunday is deleted, while a news program from Tuesday would then be associated with the channel combination 315-1.

Entry 470 represents an audio based media service, "OPIE AND ANTHONY" which is broadcasted over the Internet from a web server, as an on demand audio broadcast. Other types of on-demand media services, such as video, audio, and audio/video programs, can be assigned major and minor channel numbers in accordance with the principles of the present invention.

Figure 5:
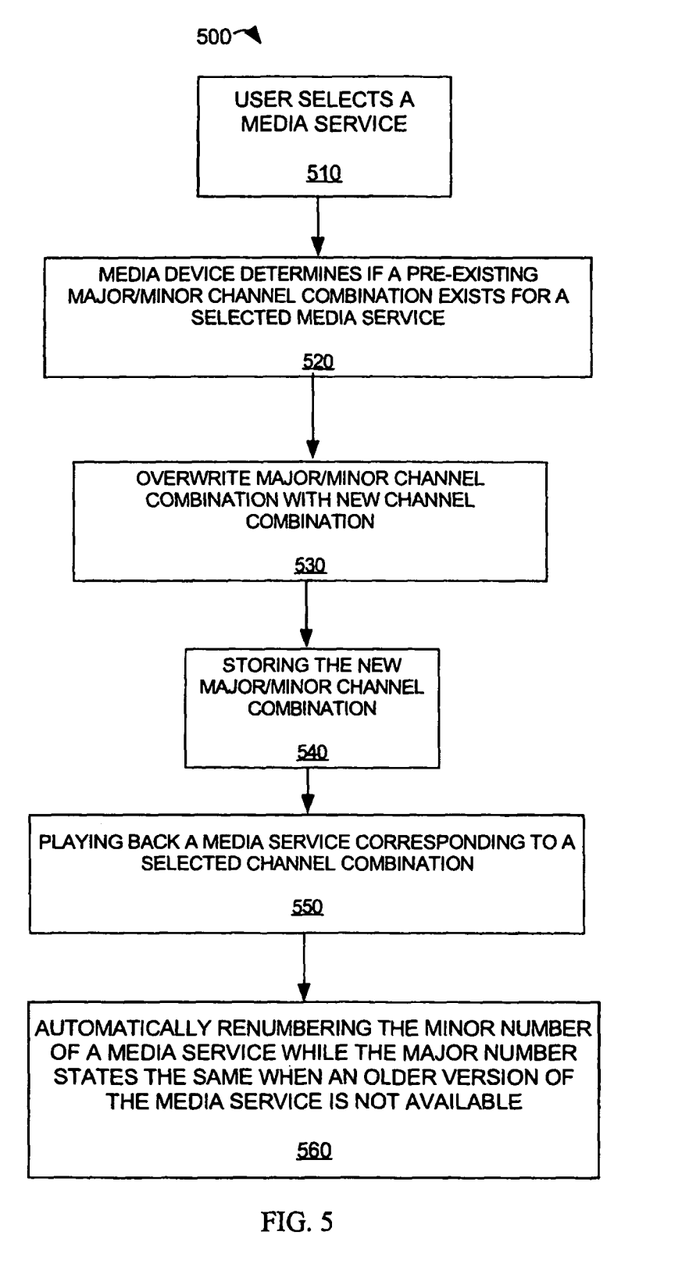
FIG. 5 is an exemplary embodiment of a method used for assigning major and minor channel combinations for different media services.

FIG. 5 presents a method 500 for the assigning of major/minor channel combinations to a media service, in accordance with the principles of the present invention. In block 510, a user selects a media service, where such a media service can be any of the media services, as identified above. Such a selection can be made by a user typing in the identifier for a particular media service such as a channel number, website address, URL, radio frequency, and the like. In step 520, a determination is made whether the media service has a predefined major/minor channel associated with it. For example, if the media service is an ATSC based television service, the STB 200 will read the program guide information (PSIP) which is transmitted as part of the media service and determine if there is an associated major/minor channel number with the media service. Other methods exist for such a determination where, for example, a download of program guide information can be performed by STB 200, from a server, where the program guide information associated major/minor channels with broadcasted television programs. Typically, such program guide information pertains to television broadcasts delivered terrestrially, through a cable network, or from a satellite pay service.

In step 530, a user is given an option to overwrite the pre-defined channel combination relation for a media service, if a major/minor channel combination already exists for a media service, with a new major/minor channel number combination for the media service. If such a pre-existing relationship does not exist, the user can likewise define a major/minor channel number combination for the media service. In step 540, STB 200 stores the user defined major/minor channel relationship, preferably in a memory 236, while in step 550, STB 200 plays back the media service in response to user entry of the major/minor channel combination associated with the media service.

Optional step 560 has STB 200 renumbering the minor numbers associated with a media service, which is defined by a particular major number. That is, as older media services are either deleted or not available, STB 200 will renumber the older media service with a lower minor channel number then the media service previously possessed. For example as stated above, the major/minor channel numbers for the news program associated with major channel number 315, will change from 315-1 to 315-0, if the Sunday version of the news program is deleted, and the next oldest news program is from Monday. Other renumbering conventions can be used in accordance with the principles of the present invention.

These and other features and advantages of the present principles can be readily ascertained by one of ordinary skill in the pertinent art based on the teachings herein. It is to be understood that the teachings of the present principles can be implemented in various forms of hardware, software, firmware, special purpose processors, or combinations thereof.

Most preferably, the teachings of the present principles are implemented as a combination of hardware and software. Moreover, the software can be implemented as an application program tangibly embodied on a program storage unit. The application program can be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform can also include an operating system and microinstruction code. The various processes and functions described herein can be either part of the microinstruction code or part of the application program, or any combination thereof, which can be executed by a CPU. In addition, various other peripheral units can be connected to the computer platform such as an additional data storage unit and a printing unit.

It is to be further understood that, because some of the constituent system components and methods depicted in the accompanying drawings are preferably implemented in software, the actual connections between the system components or the process function blocks can differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications can be effected therein by one of ordinary skill in the pertinent art without departing from the scope or spirit of the present principles. All such changes and modifications are intended to be included within the scope of the present principles as set forth in the appended claims.

The invention claimed is:

1. A method performed by a receiving device for assigning a channel combination to an internet media service comprising:

selecting the internet media service which does not have a pre-existing channel identifier denoted by a major channel number and a minor channel number, wherein a combination of the major channel number and the minor channel number is used by the receiving device to access a television channel with the major channel number being associated with a television service broadcaster, and the minor channel number being associated with a sub-channel of the television service broadcaster;

assigning in an electronic program guide for the receiving device an assigned major channel number and an assigned minor channel number to the internet media service so as to associate the channel combination with said internet media service, wherein the channel combination includes the assigned major channel number and the assigned minor channel number;

assigning said assigned major channel number to a website;

assigning said assigned minor channel number to a page of said website;

entering said channel combination to initiate playback of said internet media service; and controlling updates from said website as being responsive to a user input.

2. The method of claim 1, wherein the user input is a refresh command.

3. The method of claim 1, wherein the user input is a user defined time interval.

4. A receiving device comprising:
a processor configured to select an internet media service which does not have a pre-existing channel identifier denoted by a major channel number and a minor channel number, wherein a combination of the major channel number and the minor channel number is used by the receiving device to access a television channel with the major channel number being associated with a television service broadcaster, and the minor channel number being associated with a sub-channel of the television service broadcaster;
said processor configured to assign an assigned major channel number and an assigned minor channel number to the internet media service as to associate the channel combination with said internet media service;
a memory for storing the assignment between the internet media service and the assigned major and minor channel number combination;
said processor configured to play back the internet media service when the assigned major channel number and the assigned minor channel number are received in response to user input,
wherein the assigned major channel number applies to a website and the assigned minor channel number applies to a page on the website and said processor is configured to control updates from said website as being responsive to a user input.

5. The receiving device of claim 4 wherein the user input is a refresh command.

6. The receiving device of claim 5, wherein the user input is a user defined time interval.

7. A non-transitory computer readable medium including instructions that are used by a computer to assign a channel combination to an internet media service, wherein the instructions comprising:
selecting the internet media service which does not have a pre-existing channel identifier denoted by a major channel number and a minor channel number, wherein a combination of the major channel number and the minor channel number is used by the receiving device to access a television channel with the major channel number being associated with a television service broadcaster, and the minor channel number being associated with a sub-channel of the television service broadcaster;
assigning in an electronic program guide for the receiving device an assigned major channel number and an assigned minor channel number to the internet media service so as to associate the channel combination with said internet media service, wherein the channel combination includes the assigned major channel number and the assigned minor channel number;
assigning said assigned major channel number to a website;
assigning said assigned minor channel number to a page of said website;
entering said channel combination to initiate playback of said internet media service; and
controlling updates from said website as being responsive to a user input.

8. The method of claim 1 wherein said assigned major channel number for the internet media service being in a different range than the major channel number for the broadcast television channel.

9. The receiving device of claim 4 wherein said assigned major channel number for the internet media service being in a different range than the major channel number for the broadcast television channel.

* * * * *